(12) United States Patent
Kazakov Korshunova et al.

(10) Patent No.: US 12,036,946 B2
(45) Date of Patent: Jul. 16, 2024

(54) DEVICE FOR SUPPORTING AND SECURING SCOOTERS AND DERIVED VEHICLES

(71) Applicants: Sergey Kazakov Korshunova, Chiva (ES); Santiago Mompo Delgado de Molina, Valencia (ES); David Marti Alegre, Valencia (ES)

(72) Inventors: Sergey Kazakov Korshunova, Chiva (ES); Santiago Mompo Delgado de Molina, Valencia (ES); David Marti Alegre, Valencia (ES)

(*) Notice: Subject to any disclaimer, the term of this patent is extended or adjusted under 35 U.S.C. 154(b) by 533 days.

(21) Appl. No.: 17/423,733

(22) PCT Filed: Jan. 17, 2020

(86) PCT No.: PCT/ES2020/070035
§ 371 (c)(1),
(2) Date: Jul. 16, 2021

(87) PCT Pub. No.: WO2020/148478
PCT Pub. Date: Jul. 23, 2020

(65) Prior Publication Data
US 2022/0063553 A1   Mar. 3, 2022

(30) Foreign Application Priority Data
Jan. 18, 2019 (ES) ................................ ES201930031

(51) Int. Cl.
*B60R 22/347* (2006.01)
*B62K 3/00* (2006.01)

(52) U.S. Cl.
CPC ............ *B60R 22/347* (2013.01); *B62K 3/002* (2013.01)

(58) Field of Classification Search
CPC ............................... B60R 22/347; B62K 3/002
See application file for complete search history.

(56) References Cited

U.S. PATENT DOCUMENTS 5,794,878 A * 8/1998 Carpenter ............... B60R 22/38
280/805

FOREIGN PATENT DOCUMENTS

| DE | 1926077 U | | 10/1965 |
| FR | 867096 A | * | 9/1941 |
| GB | 1265726 | | 3/1972 |
| GB | 2310641 A | | 9/1997 |
| GB | 2491201 A | | 11/2012 |

* cited by examiner

*Primary Examiner* — Kevin Hurley
(74) *Attorney, Agent, or Firm* — The Webb Law Firm

(57) ABSTRACT

The disclosure relates to a supporting and securing device that is fixed to a scooter-like vehicle or similar by means of a gripping mechanism to secure and grip a user of the vehicle. The device includes a mechanism configured to roll up and lock a belt that surrounds the user, securing and supporting him or her and surrounding a part of his or her back. The mechanism automatically adjusts to the user's position and includes a pressing assembly that allows the length of the unwound belt to be fixed, and a coupling element that connects to a main case. The disclosure also relates to the vehicle including the described device. The disclosure falls within the technical field of parts of vehicles, more specifically vehicle safety belts or harnesses or ease of use while driving.

20 Claims, 4 Drawing Sheets

DEVICE FOR SUPPORTING AND SECURING SCOOTERS AND DERIVED VEHICLES

CROSS-REFERENCE TO RELATED APPLICATIONS

This application is the United States national phase of International Application No. PCT/ES2020/070035 filed Jan. 17, 2020, and claims priority to Spanish Patent Application No. P201930031 filed Jan. 18, 2019, the disclosures of which are hereby incorporated by reference in their entirety.

BACKGROUND OF THE DISCLOSURE

Field of the Disclosure

The present disclosure relates to a device for supporting and securing at least one person or user who uses a scooter-like vehicle, such that the device comprises a belt that is wound inside same, where said belt can be used as a backrest by the user and in turn limit the possible movements that may occur both in the direction opposite the path of the scooter and perpendicular to same.

The disclosure falls within the technical field of vehicles parts not provided elsewhere, more specifically vehicle safety belts or harnesses.

DESCRIPTION OF RELATED ART

One of the aspects having the most decisive effect on the development and design of a means of transport is the safety of the people it carries, in addition to comfort, providing a pleasant posture, vision, auditory arrangement, etc. as much as possible for said users while using same.

The shape and composition of the parts and the respective materials which are included in each of the transports used today are thereby aimed at the user making the smallest possible effort while driving to reduce fatigue and improve the use experience, making it as comfortable as possible, reducing the efforts needed, expanding the time during which the driver is able to maintain his or her concentration and physical condition necessary for safe driving.

By way of example, there are a number of elements in a car which perform these functions, such as headrests, rear-view mirrors, adjustable seats, kidney support, armrests or even climate control systems. The objective of all these elements is to prevent any excess efforts and reduce fatigue, not only by increasing comfort but also by increasing the safety of the user and of the possible agents involved.

Within this objective of providing means of comfort and safety for users of vehicles, in this case scooter-like vehicles or similar, which lack said means and are mandatory in other types of transport, such as securing elements or backrests, this disclosure consisting of providing a support for users of said vehicles has arisen.

On the market there are some devices with similar objectives, such as the device described in document ES-2681847-T3 relating to a support or protection device adapted for receiving at least one part of a person therein for protecting him or her, counteracting localised external and excessive forces such as crashes or impacts, or document ES-1218545-U defining a belt or harness with a float concealed between its layers that is automatically inflated upon pulling on a cord attached to a $CO_2$ ignition motor which inflates it, providing a type of float for the user in case of emergency or exhaustion.

These supporting and securing devices have been aimed at and are being used in sports application fields, such as kitesurf, windsurf, hang gliding or paragliding, where the user receives a very high load in certain parts of his or her body. To this end, the developed supports are designed to be coupled to the means of transport in order to absorb the stresses resulting from jerking, crashes or impacts, which allow the user to withstand higher stresses and to be protected against sudden movements.

Therefore, although the function is similar, in addition to requiring a complex and heavy structure, these devices do not allow a variable adjustment of the distance to the fixing point. This is fundamental for the user to be able to lean back at all times and with absolute safety without the risk of falling as his or her body moves in the direction opposite the direction of travel after having moved the axis in that direction.

SUMMARY OF THE DISCLOSURE

The present disclosure has been designed with the knowledge of the described background, with the present disclosure solving the drawbacks of the state of the art, improving or offering a support system which did not exist up until now in vehicles such as scooters or similar which essentially do not have a seat or back, which allows the user to reduce the fatigue to which he or she is subjected while driving.

In order to fulfil the described functions and avoid the drawbacks mentioned in the preceding sections, the supporting and securing device defined for vehicles of this type allows the user to lean back on a backrest while at the same time limiting accidental movements in the direction opposite and transverse to the path of the vehicle.

The main objective of the device of the disclosure is to increase use comfort and experience, which results in driving that requires less efforts, reducing exhaustion, and which allows concentration and stability to be maintained for a prolonged time.

Therefore, the supporting and securing device is configured to aid like a backrest, increasing comfort, as well as to reduce the effort and exhaustion in users of scooter-like vehicles or similar, comprising to that end a grip attaching the device to a part of said vehicle. This grip can be fixed and permanent or detachable and temporary, depending on the characteristics and needs of the user with respect to the vehicle. Furthermore, the supporting and securing device can be positioned in an outer part of the vehicle such that the grip is secured to a visible external element, or it can be housed and fitted inside a chassis of said vehicle, where there are only some external elements accessible to the user for operating the device, with the grip being concealed in this case.

The device further comprises a main case rigidly attached to the grip by means of a linking element, preventing both parts from moving with respect to one another, and an extraction and collection mechanism, located inside said main case, which is configured to fix and lock a belt at a specific length, where it can be wound or unwound depending on the expanse or the disposition of the user.

The belt consists of a very strong flexible strap configured to be wound and unwound in the mechanism and to secure and support the user surrounding part of his or her back.

The device comprises a case cover attached to the main case, which prevents the extraction mechanism from being able to accidentally come out. This cover comprises a through hole configured to house and fix a pressing assembly configured to lock and unlock the mechanism from the outside, without needing to open the cover of the mechanism, fixing the length of the belt.

One end of the belt is attached to a coupling element configured to connect said end of the belt to the main case once the belt has been wound around or surrounds a part of the user for support.

Therefore, once the coupling element is connected, the operation of the mechanism of the supporting device consists of the belt being fixed, allowing the user to lean back on same without moving. The mechanism is thereby configured to roll up the belt as the circumference going around the user becomes narrower, in the case where the user moves closer to the device, the belt being wound on a main shaft comprised in said mechanism, such that if the user tries to move away and extend the length of the belt, he or she can do so by actuating the pressing assembly which releases said belt upon exerting a slight tensile strain on same, unwinding it on said main shaft to the desired length.

For a suitable operation of the mechanism, said mechanism comprises, in addition to the main shaft, an upper structure and another inferior structure which, together with a first structural post, a second structural post and a third structural post, form the frame of the mechanism, providing rigidity to the mechanism.

For winding and unwinding the belt, the mechanism comprises a locking part, with its corresponding locking part spring, a secondary shaft with teeth and a locking lever with its corresponding locking lever spring, with said elements configured to lock and unlock the exit of the belt.

Moreover, the device comprises a main spring which is in charge of exerting a force on the main shaft to roll up the belt. This spring has a main spring case preventing outer bodies from locking said main spring, as well as a spacer configured to ensure the operation of the shafts when winding and unwinding the belt.

The pressing assembly comprises a button which, when pressed, unlocks the mechanism to unwind the belt, a spring recovering the initial position of the button when it is no longer pressed and a button support with a button base fixing the position of the pressing assembly in the case cover and preventing the button from being jammed in the through hole of said cover when pressed.

The linking element is manufactured in a material selected from the group consisting of steels, aluminium, rigid plastics and any combination thereof.

The coupling element is manufactured in a material selected from the group consisting of aluminium, plastic, steel and any combination thereof, since they provide structural conditions sufficient for coupling to the case of the mechanism.

The main case is also manufactured in a material selected from the group consisting of aluminium, plastic, steel and any combination thereof for the same reasons, as well as their ease of manufacture.

The elements comprised in the mechanism are manufactured in a material selected from the group consisting of aluminium, plastic, steel and any combination thereof, while the belt is preferably manufactured in polyester due to its mechanical strength conditions combined with its flexibility.

The attachment of the grip to the vehicle can be completely rigid, such that the only way to adapt the suitable position of the user with respect to the vehicle is due to the flexibility of the belt; or it can be articulated, which allows the horizontal rotation of the grip. Furthermore, the attachment of the grip to the vehicle can be permanent when performed with definitive welds, rivets or screws, or temporary, being performed with adjustable flanges, or Velcro strips and straps which allow the device to be readily disassembled from the vehicle.

The coupling element consists of a carabiner of the type comprising a body, a hinge constituting the opening means of the carabiner and a safe configured to lock the accidental opening of said hinge.

In one embodiment, the main case comprises an outer through hole configured to connect the coupling element to said main case when the belt is surrounding and securing the user of the vehicle.

In one embodiment, the belt comprises a padded element configured to provide lumbar support or any type of support for the user of the vehicle. This lumbar support increases the contact surface that only the belt has, improving the distribution of loads on the back and, therefore, comfort when using the device.

This padded element can be manufactured in different types of plastic, fabrics or leathers, due to the wear resistance conditions thereof, in addition to other materials selected depending on the manufacturer's criterion.

One of the advantages offered by the padded element is that it comprises a pocket-like cavity configured to introduce and store an electronic device, such as a mobile phone or similar.

In one embodiment, the supporting and securing device comprises at least one impact detector for the vehicle, an excess tension detector for the belt, an inflating device configured to be activated upon receiving a signal from at least one of said detectors and a nylon bag configured to be inflated by means of said inflating device.

The impact detectors can be located in any part of the vehicle, preferably in the front part, but also on any part of the supporting and securing device itself, such as the padded element, while the excess tension detectors are located inside the case, connected to the mechanism of the belt. Both types of detectors are connected to the inflating device, such that upon detecting a strong impact or tension on the belt that is much higher than that of use, a signal is sent on said inflating device, which insufflates gas into the nylon bag.

The nylon bag can be positioned so as to be attached to the main case, in the padded element of the belt or both, such that it cushions or dampens a possible impact of the user.

In one embodiment, the supporting and securing device comprises reflective elements in the belt and in the padded element, which allow the user and the vehicle to be more readily seen by third parties.

In one embodiment, the supporting and securing device comprises braking and lane change notifying means, activated by the user of the vehicle. These means can be elements configured to light up, such as lights located in the front part of the vehicle or in the rear part, as well as in the padded element, as this element is preferably located in the rear part of the user.

Additionally, the device can further comprise position lighting means which facilitate seeing the user and the vehicle.

The disclosure also consists of the vehicle comprising the defined supporting and securing device, this vehicle being a scooter or a vehicle with similar characteristics, in which the body of the user is not fixed to any element of the vehicle other than the support for the feet at a base for supporting and securing the hands on the steering wheel.

In this case, depending on the vehicle, the main case of the securing and support device can be an element outside the vehicle, or it can be housed and coupled inside the chassis of said vehicle, where the belt, the pressing assembly and the outer hole are the only external elements accessible to the user.

BRIEF DESCRIPTION OF THE DRAWINGS

To complement the description provided herein, and for the purpose of helping to make the features of the disclosure more readily understandable, said description is accompanied by a set of drawings constituting an integral part of the same, which by way of illustration and not limitation represents the following.

DETAILED DESCRIPTION

As seen in FIGS. 5a-5e, the disclosure relates to a supporting and securing device (1) which attaches or secures a user (13) to a scooter-like vehicle (12) for the purpose of providing additional securing means and providing greater comfort by supporting his or her lumbar area.

Figure 2:
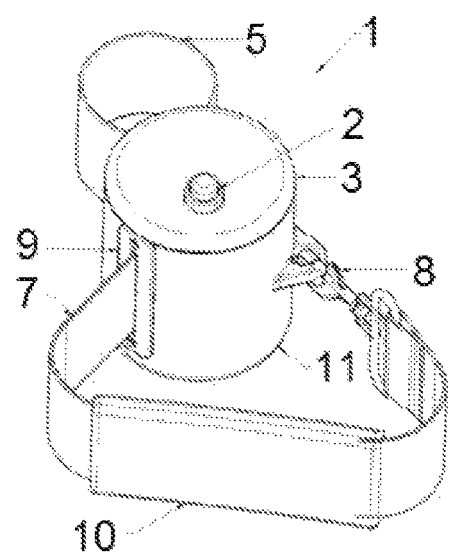
FIG. 2 shows an isometric view of the assembled securing device in which it can be seen how the belt is connected to the main case by means of the carabiner or coupling element as well as the attachment of the belt through the opening of the decorative chamfer.

FIG. 2 shows said supporting and securing device (1), in which there can be distinguished a cylindrical-shaped metallic main case (11), open at one of its bases in order to allow the housing of a mechanism (6) configured to let go of and collect a flexible belt (7) made of polyester and on which the user (13) is supported, such that said open base is closed with a case cover (3) which prevents the mechanism (6) from being able to accidentally come out of said main case (11).

Figure 3:
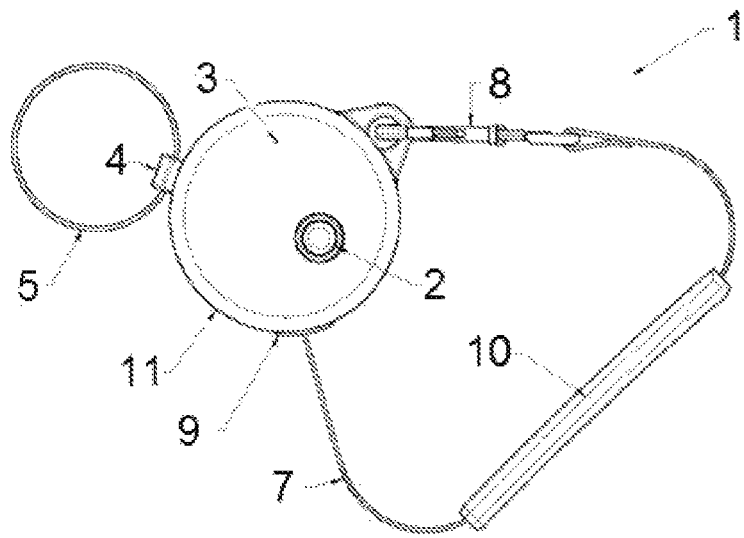
FIG. 3 shows a plan view of the securing device in which the location of the linking element, the securing system, the gripping mechanism, the belt and the cushion, as well as the attachment between said elements, can be seen with precision.

As seen in FIGS. 2 and 3, the main case (11) is attached to a grip (5) consisting of an element attaching the device (1) with the vehicle (12), encircling and going around it to fix the position thereof. In those figures, it is observed that the grip (5) has a cylindrical shape to be adapted to the steering bar (14) of the vehicle (12), and it is attached to the supporting and securing device (1) by means of a link (4), preferably a non-slip link to prevent both elements from being able to slide or move with respect to one another, the grip (5) therefore being rigidly attached to the vehicle (12) and the device (1) rigidly attached to the grip (5).

Figure 1:
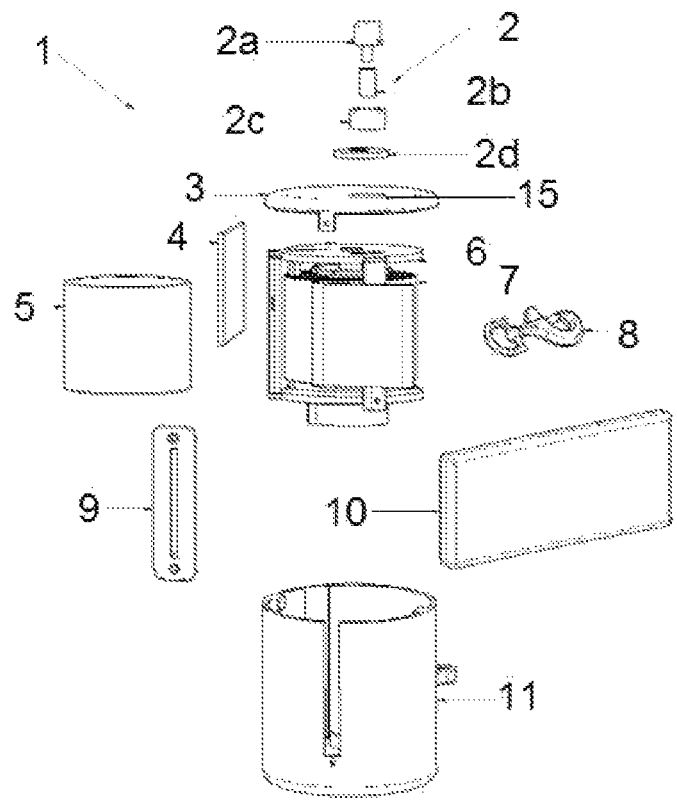
FIG. 1 shows an exploded view of the securing device in which the parts forming the assembly can be seen in a disassembled state.

As seen in the exploded view of FIG. 1, the belt (7), wound up, is located inside the main case (11) and the mechanism (6), which belt is extracted by pulling on it from one end, being unwound and coming out through a chamfer (9), coupled to the main case (11). This belt (7) has a metallic coupling element (8) at said end, while the other end of the belt (7) is attached to the mechanism (6).

This coupling element (8) consists of a carabiner having a body and a hinge, which allows the opening of the carabiner, said coupling element (8) being defined to be attached to an outer hole (15) of the main case (11), as observed in FIG. 2.

The operation of the mechanism (6) of the securing and support device (1) thereby consists of, once the user (13) surrounds part of his or her body, preferably his or her back and lumbar region, and connects the coupling element (5) to the outer hole (15), the belt (7) is fixed, allowing the user (13) to lean back on same, such that the load exerted on said belt (7) is transferred to the supporting device (1) and from there to the vehicle (12).

For the support to be more comfortable, the belt (7) comprises a padded element (10) to increase the contact surface of the user (13), said padded element (10) being configured to support the lumber region, reducing fatigue during travel.

Once the user (13) uses the vehicle (12), the mechanism (6) is configured to roll up the belt (7) when there is no longer any tension on same, i.e., when it is not pulled on, which occurs when the user (13) moves closer to the device (1), the belt (7) being wound on a main shaft (6a) comprised in said mechanism (6). In the event that the same user (13) tries to move away from the device (1) and extend the length of the belt (7), he or she must actuate the pressing assembly (2), which releases said belt (7) by pulling on same, unwinding it from said main shaft (6a), because in the case of not activating the pressing assembly (2), the mechanism (6) locks the exit of the belt (7). When the user does not use of the belt (7), the coupling element (7) can be connected to the main case (11), making the device (1) more compact for the storage thereof, as shown in FIG. 2.

Therefore, the configuration of the mechanism (6) consists of locking the belt (7) when it is pulled on and rolling it up when it is let go, releasing or unlocking it upon activating the pressing assembly (2). This is because upon unlocking the mechanism (6) by activating the pressing assembly (2), the preferably circular locking part (6c) is locked, preventing the locking lever (6g) from fixing the secondary shaft with teeth (6m) where the belt (7) is coupled. This allows the length of the belt (7) to be configured according to the needs of each user (13).

The locking part (6c) is aided by a locking part spring (6d) to keep the locking lever (6g) released. The spring (6e) demarcates the range of movement of the locking lever (6g). This spring (6e) allows the locking lever (6g) to be supported at all times on the locking part (6c) so that, when pressure on the pressing assembly (2) is eliminated, it is coupled with the secondary shaft with teeth (6m), thus locking the belt (7). The spring case (6k) located in the lower part of the mechanism (6) contains main spring (6j), preferably a coil spring, which is the element that is mechanically coupled to the main shaft (6a) and maintains its torsion at all times, thus allowing the automatic rolling up of the belt once it is released.

Figure 4:
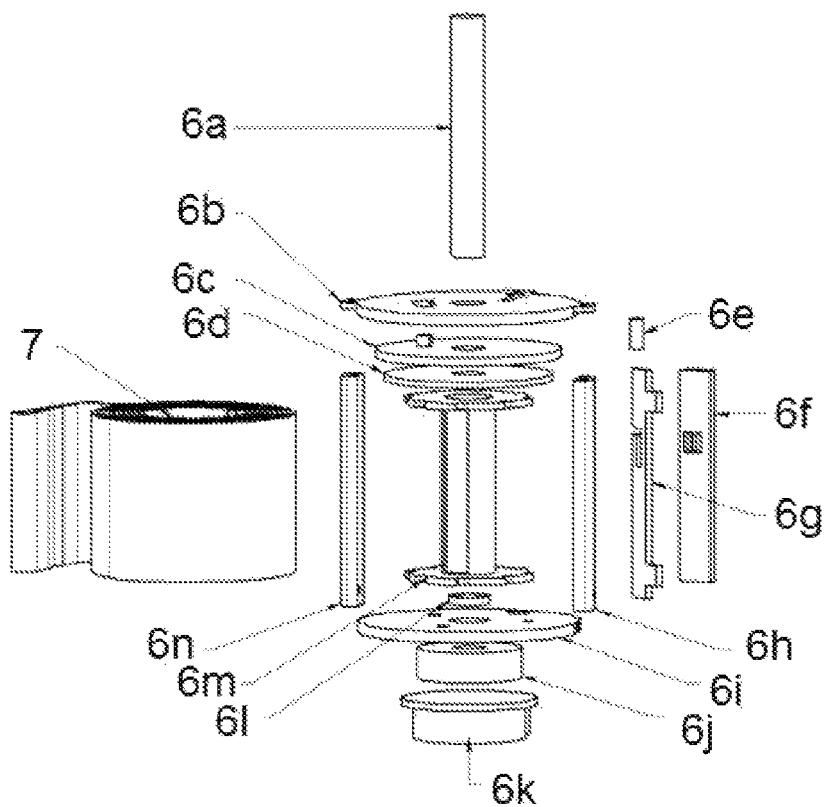
FIG. 4 shows an exploded view of the securing device, more specifically of the belt mechanism, in which each of the parts forming it can be seen.
Figure 5A:
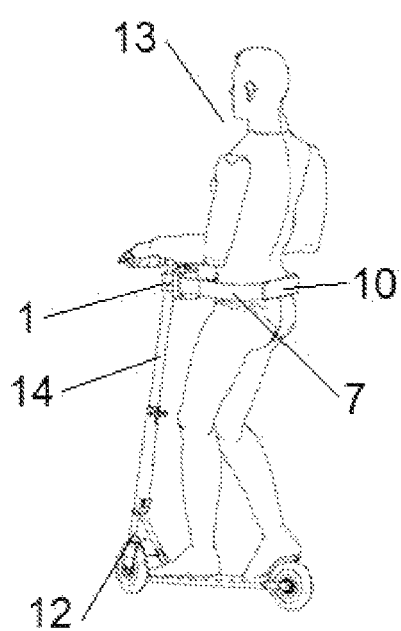
FIGS. 5a-5e show five different perspective views of the securing device in operation, in which the use thereof by a user of a scooter or of a derived vehicle can be seen, providing stability and comfort while driving.
Figure 5B:
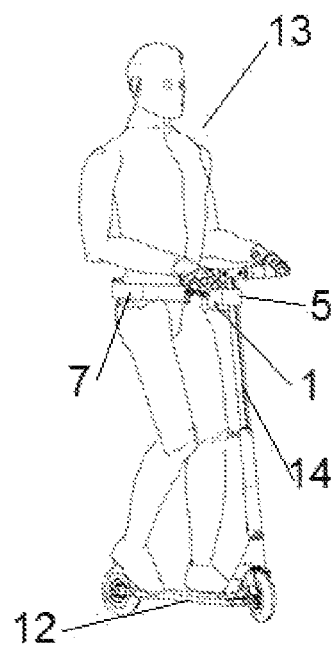
Figure 5C:
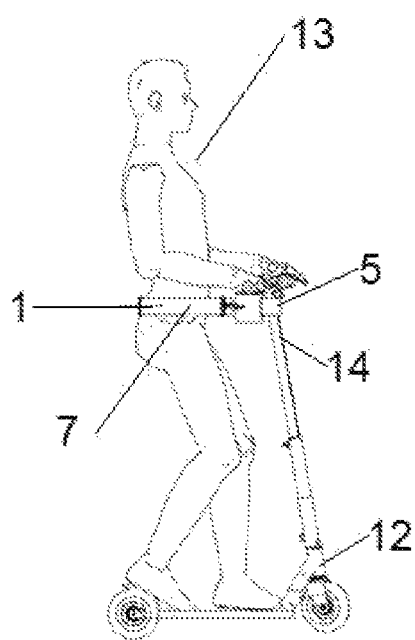
Figure 5D:
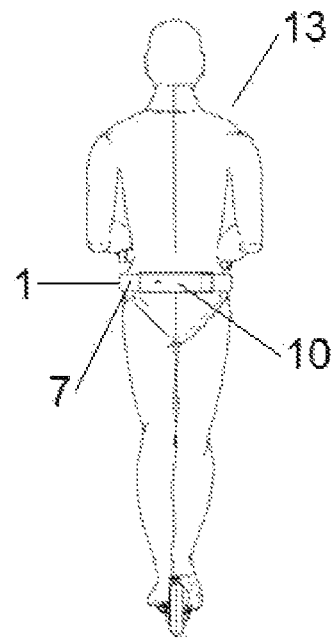
Figure 5E:
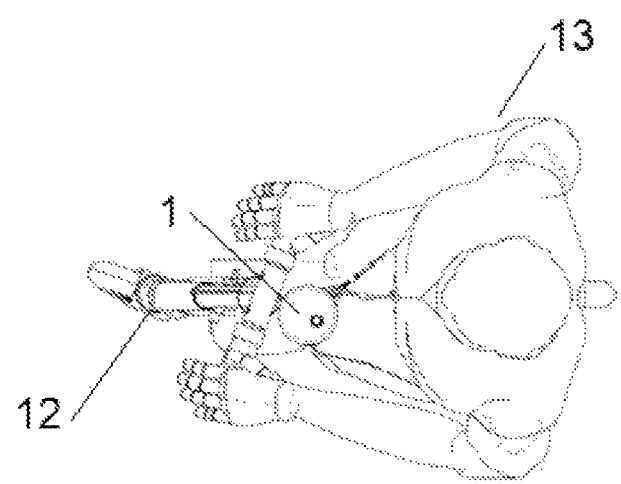

The mechanism (6) further comprises a mount or structure, as shown in FIG. 4, consisting of an upper structure (6b) and a lower structure (6i) which, together with a first structural post (6f), a second structural post (6h) and a third structural post (6n), form the frame of the mechanism (6) and allow the rigidity of the assembly thereof.

Moreover, the pressing assembly (2) is comprised of a button (2a) which, when pressed, unlocks the mechanism (6), a spring (2b) recovering the position of the button (2a) when it is no longer pressed and a button support (2c) with a button base (2d) fixing the position of the pressing assembly (2) in the case cover (3) and preventing the button (2a) from being jammed in the through hole of said cover (3).

The invention claimed is:

1. A supporting and securing device configured to support and secure users to vehicles, comprising:
    a grip configured to attach the supporting and securing device to a part of said vehicle;
    a main case rigidly attached to the grip by means of a link;
    an extraction and collection mechanism located inside main case configured to roll up and lock a belt;
    the belt configured to be wound and unwound in the mechanism and to secure and support the user surrounding part of his or her body;
    a case cover attached to the main case, comprising a through hole configured to house and fix a pressing assembly;
    the pressing assembly configured to lock and unlock the mechanism by fixing the length of the unwound belt;
    a coupling element attached to an end of the belt configured to connect said end of the belt to the main case;
    wherein the mechanism is configured to wind the belt on a main shaft comprised in said mechanism when it is locked; and wherein the mechanism is unlocked upon activating the pressing assembly, unwinding and releasing said belt upon exerting tension by pulling on same.

2. The supporting and securing device according to claim 1, wherein in addition to the main shaft configured to wind the belt, the mechanism comprises:
    an upper structure and a lower structure which, together with a first structural post, a second structural post and a third structural post, form the frame of the mechanism;
    a locking part, a locking part spring, a locking lever and a locking lever spring configured to lock and unlock a main spring; a secondary shaft with teeth configured, together with the locking lever, to lock the exit of the belt;
    the main spring exerting a force to roll up the belt; and
    a main spring case preventing outer bodies from locking said main spring and keeping the spring tensioned to automatically roll up the belt.

3. The supporting and securing device according to claim 1, wherein the pressing assembly comprises a button which, when pressed, unlocks the mechanism, a springy recovering the position of the button when it is no longer pressed and a button support with a button base fixing the position of the pressing assembly in the case cover and preventing the button from being jammed in the through hole of said cover.

4. The supporting and securing device according to claim 1, wherein the link is manufactured in a non-slip material.

5. The supporting and securing device according to claim 1, wherein the coupling element is manufactured in a material selected from the group consisting of aluminium, plastic, steel and any combination thereof; and
    the main case is manufactured in a material selected from the group consisting of aluminium, plastic, steel and any combination thereof; and/or
    the mechanism and the elements forming it are manufactured in a material selected from the group consisting of aluminium, plastic, steel and any combination thereof.

6. The supporting and securing device according to claim 1, wherein the belt is manufactured in polyester fabrics, cotton, wool, silk, leather and any combination thereof.

7. The supporting and securing device according to claim 1, wherein the type of attachment of the grip to the vehicle is selected from the group consisting of rigid and articulated, and/or the type of attachment of the grip to the vehicle is selected from the group consisting of permanent and temporary.

8. The supporting and securing device according to claim 1, wherein the grip comprises at least one element selected from the group consisting of screws, rivets, welds and flanges for the attachment to the vehicle.

9. The supporting and securing device according to claim 1, wherein the coupling element consists of a carabiner of the type comprising a body, a hinge constituting the opening means of the carabiner and a safe configured to lock the accidental opening of said hinge.

10. The supporting and securing device according to claim 1, wherein the main case comprises an outer through hole configured to connect the coupling element to said main case.

11. The supporting and securing device according to claim 1, wherein the belt comprises a padded element configured to provide lumbar support to the user of the vehicle.

12. The supporting and securing device according to claim 1, wherein the padded element is manufactured in a material selected from the group consisting of plastic, fabrics, cotton, wool, silk, leather and any combination thereof.

13. The supporting and securing device according to claim 1, wherein the padded element comprises a cavity configured to introduce and store an electronic device.

14. The supporting and securing device according to claim 1, wherein it comprises at least one impact detector for the vehicle, an excess tension detector for the belt, an inflating device configured to be activated upon receiving a signal from at least one of said detectors and a nylon bag configured to be inflated by means of said inflating device.

15. The supporting and securing device, according to claim 11, wherein it comprises reflective elements in the and in the padded element.

16. The supporting and securing device according to claim 1, wherein it comprises braking and lane change notifying means of the vehicle.

17. The supporting and securing device according to claim 1, wherein the braking and lane change notifying means consist of elements configured to light up.

18. The supporting and securing device according to claim 1, wherein it comprises lighting means.

19. A vehicle comprising the supporting and securing device defined in claim 1 and in that said vehicle is selected from the group consisting of scooters or similar vehicles.

20. The vehicle according to claim 16, wherein the main case is housed and coupled inside a chassis of said vehicle, wherein the belt, the pressing assembly and the outer hole are the only external elements accessible to the user.

* * * * *

UNITED STATES PATENT AND TRADEMARK OFFICE
CERTIFICATE OF CORRECTION

| | | |
|---|---|---|
| PATENT NO. | : 12,036,946 B2 | |
| APPLICATION NO. | : 17/423733 | |
| DATED | : July 16, 2024 | |
| INVENTOR(S) | : Sergey Kazakov Korshunova et al. | |

It is certified that error appears in the above-identified patent and that said Letters Patent is hereby corrected as shown below:

In the Claims

Column 7, Line 44, Claim 3, delete "springy" and insert -- spring --

Column 7, Line 54, Claim 5, delete "and" and insert -- and/or --

Column 8, Line 33, Claim 13, delete "claim 1," and insert -- claim 11, --

Column 8, Line 41, Claim 15, delete "device," and insert -- device --

Column 8, Line 42, Claim 15, delete "the" and insert -- the belt --

Column 8, Line 51, Claim 18, delete "comprises" and insert -- comprises a --

Column 8, Line 56, Claim 20, delete "claim 16," and insert -- claim 19, --

Signed and Sealed this
Eighth Day of October, 2024

Katherine Kelly Vidal
*Director of the United States Patent and Trademark Office*